(12) United States Patent
Fenderson et al.

(10) Patent No.: US 11,738,292 B2
(45) Date of Patent: Aug. 29, 2023

(54) TERPOLYMERS FOR OIL SANDS TAILINGS TREATMENT

(71) Applicant: KEMIRA OYJ, Helsinki (FI)

(72) Inventors: Tom Fenderson, Decatur, GA (US); Igal Maasen, Acworth, GA (US); Erica Pin, Houston, TX (US); Miguel Pelaez, Decatur, GA (US)

(73) Assignee: KEMIRA OYJ, Helsinki, FL (US)

( * ) Notice: Subject to any disclaimer, the term of this patent is extended or adjusted under 35 U.S.C. 154(b) by 0 days.

(21) Appl. No.: 16/644,543

(22) PCT Filed: Sep. 4, 2018

(86) PCT No.: PCT/US2018/049345
§ 371 (c)(1),
(2) Date: Mar. 5, 2020

(87) PCT Pub. No.: WO2019/050835
PCT Pub. Date: Mar. 14, 2019

(65) Prior Publication Data
US 2021/0060455 A1    Mar. 4, 2021

Related U.S. Application Data

(60) Provisional application No. 62/554,146, filed on Sep. 5, 2017.

(51) Int. Cl.
*B01D 21/01* (2006.01)
*C02F 1/52* (2023.01)
(Continued)

(52) U.S. Cl.
CPC ............ *B01D 21/01* (2013.01); *C02F 1/5245* (2013.01); *C02F 11/148* (2019.01);
(Continued)

(58) Field of Classification Search
None
See application file for complete search history.

(56) References Cited

U.S. PATENT DOCUMENTS

| 4,552,670 A | 11/1985 | Lipowski et al. |
| 2013/0153511 A1* | 6/2013 | Smits .................... C02F 1/5227 210/731 |

(Continued)

FOREIGN PATENT DOCUMENTS

CA    2990527    6/2018

OTHER PUBLICATIONS

Liu, C., Hong, B., Xu, K. et al. Synthesis and application of salt tolerance amphoteric hydrophobic associative flocculants. Polym. Bull. 71, 3051-3065 (2014). https://doi.org/10.1007/s00289-014-1237-8.

*Primary Examiner* — Clare M Perrin
(74) *Attorney, Agent, or Firm* — Robin L. Teskin; Baker, Donelson, Bearman, Caldwell & Berkowitz PC

(57) ABSTRACT

Terpolymers and use thereof are provided comprising one or more nonionic monomers, one or more anionic monomers and one or more cationic monomers, These terpolymers and compositions containing may be used as flocculants, for example, for treating tailings, such as oil sands tailings, to facilitate solid-liquid separation, for example, in order to efficiently recycle water and/or to reduce the volume of tailings which may be transferred to a tailings pond and/or to a dedicated disposal area.

25 Claims, 5 Drawing Sheets

(51) Int. Cl.
*C02F 11/148* (2019.01)
*C08F 220/06* (2006.01)
*C08F 220/34* (2006.01)
*C08F 220/56* (2006.01)
*C08L 33/02* (2006.01)
*C10G 1/00* (2006.01)
*B03D 3/02* (2006.01)
*B03D 3/06* (2006.01)
*C10G 1/04* (2006.01)

(52) U.S. Cl.
CPC .......... *C08F 220/06* (2013.01); *C08F 220/34* (2013.01); *C08F 220/56* (2013.01); *C08L 33/02* (2013.01); *C10G 1/002* (2013.01); *B03D 3/02* (2013.01); *B03D 3/06* (2013.01); *C10G 1/045* (2013.01)

(56) References Cited

U.S. PATENT DOCUMENTS

| | | | |
|---|---|---|---|
| 2014/0080944 A1* | 3/2014 | Andermann, Jr. | C02F 1/5236 524/72 |
| 2014/0319070 A1* | 10/2014 | Favero | C08L 33/26 210/728 |
| 2015/0353664 A1 | 12/2015 | Sortwell | |

* cited by examiner

TERPOLYMERS FOR OIL SANDS TAILINGS TREATMENT

RELATED APPLICATIONS

This application is a U.S. National Phase application of International Application No. PCT/US18/49345, filed Sep. 4, 2018, which claims priority to U.S. Provisional Application No. 62/554,146 filed Sep. 5, 2017, each of which is incorporated herein by reference.

FIELD OF THE ART

The present disclosure generally relates to terpolymers, compositions containing said terpolymers and uses thereof, in the processing of tailings, such as, for example, oil sands tailings.

BACKGROUND

Bituminous sands, also referred to as oil sands, are a type of petroleum deposit. Oil sands typically contain naturally occurring mixtures of sand, clay, water, and a dense, extremely viscous form of petroleum technically referred to as bitumen (or colloquially "tar" due to their similar appearance, odor, and color). Oil sands may be found in large quantities in many countries throughout the world, most abundantly so in Canada and Venezuela. Oil sand deposits in northern Alberta in Canada (Athabasca oil sands) are thought to contain approximately 1.6 trillion barrels of bitumen, and production from oil sands mining operations is expected to reach 1.5 million barrels of bitumen per day by 2020.

Oil sands reserves are an important part of the world's oil reserves, particularly as higher oil prices and new technology enable oil sands reserves to be profitably extracted and upgraded to usable products. Oil sands are often referred to as unconventional oil or crude bitumen, in order to distinguish the bitumen extracted from oil sands from the free-flowing hydrocarbon mixtures known as crude oil traditionally produced from oil wells.

Conventional crude oil may be extracted from the ground by drilling oil wells into a petroleum reservoir and allowing oil to flow into them under natural reservoir pressure, although artificial lift and techniques such as water flooding and gas injection may be required to maintain production as reservoir pressure drops toward the end of a field's life. Since extra-heavy oil and bitumen flow very slowly, if at all, towards producing wells under normal reservoir conditions, the sands may be extracted by strip mining or the oil made to flow into wells by in situ techniques that reduce the viscosity, such as by injecting steam, solvents, and/or hot air into the sands. These processes may use more water and may require larger amounts of energy than conventional oil extraction, although many conventional oil fields also typically require large amounts of water and energy to achieve good rates of production.

Water-based oil sand extraction processes generally include ore preparation, extraction, and tailings treatment stages wherein a large volume of solids-laden aqueous tailings may generally be produced. These tailings, which generally contain water, solids, and residual bitumen, may generally be referred to as oil sands process tailings, or oil sands tailings. These tailings are in need of solid-liquid separation in order to efficiently recycle water and reduce the volume of tailings. In many processes, these oil sands tailings are pumped into large settling ponds (or tailings ponds).

In tailings ponds, the process water, unrecovered hydrocarbons, and minerals generally settle naturally to form different strata. The upper stratum is usually primarily water that may be recycled as process water to the extraction process. The lower stratum generally contains the heaviest materials, mostly sand, which settle to the bottom of the pond. The middle stratum, often referred to as "mature fine tailings" ("MFT"), typically are comprised almost entirely of solids generally <44 microns. Mature fine tailings also generally include water and hydrophilic and biwetted ultra-fine solids, mainly clays and other charged silicates and metal oxides, that tend to form stable colloids in water and exhibit a very slow settling and dewatering behavior, resulting in tailing ponds that may take several years to manage.

The composition of mature fine tailings tends to be highly variable. Near the top of the stratum the mineral content may be about 10% by weight and over time may consolidate and comprise up to 50% by weight of the materials contained at the bottom of the stratum. Overall, mature fine tailings generally have an average mineral content of about 30%-35% by weight. While fines often comprises the dominant particle size fraction in the mineral content, the sand content is appreciable, e.g., it may comprise as much as 15% by weight of the solids and the clay content is often very substantial, e.g., it may be up to 75% by weight of the solids, reflecting the oil sand ore and extraction process. Additional variation may result from the residual hydrocarbon which may be dispersed in the mineral or may segregate into mat layers of hydrocarbon. The mature fine tailings in a pond may not only contain a wide variation of compositions distributed from top to bottom of the pond, but also may contain pockets of different compositions at random locations throughout the pond. Based on the foregoing, mature fine tailings generally behave as a fluid-like colloidal material.

The slow settling of fine (<44 μm) and ultrafine clays (<2 μm) as well as the large demand of water during oil sand extraction process have promoted research and development of new technologies to modify the water release and to improve settling characteristics of tailings streams. Some methods of treating of tailings streams comprise the use of flocculants. Flocculants, or flocculating agents, are chemicals that promote flocculation by causing colloids and other suspended particles in liquids to aggregate, thereby forming a floc. Flocculants are generally used in water treatment processes to improve the sedimentation or filterability of small particles. Flocculants that have been used in treatments for dewatering oil sands tailings include polyacrylamide polymer flocculants.

In treatment processes for dewatering oil sands tailings, clays and ultra-fine solids (<2 μm) are often challenging to capture and in many instances may remain suspended in the treated water which is generally recycled back to the extraction process. These solids may in particular be detrimental to bitumen recovery, therefore, maximizing separation of the fines from the water during tailings treatment is of general importance. Particularly, improving the treatment of tailings is of great interest.

BRIEF SUMMARY

The present embodiments generally pertain to a terpolymer suitable for use as a flocculant which comprises one or more acrylamide ("AMD") monomers, one or more calcium diacrylate ("CDA") monomers, and one or more cationic monomers, and to a composition comprising one or more of said terpolymers. In some embodiments, said one or more cationic monomers of said terpolymer and/or composition may comprise the following: acryloyloxyethyl trimethylammonium chloride ("AETAC"), methacryloyloxyethyltrimethylammonium chloride ("MAETAC"), methacrylamidopropyltrimethylammonium chloride ("MAPTAC"), acrylamidopropyltrimethylammonium chloride ("APTAC"), dialkylaminoalkyl acrylates and methacrylates, e.g., dimethylaminoethyl methacrylate ("DMAEMA"), and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as dimethylaminopropyl acrylamide methyl sulfate quaternary salt, dimethylaminopropyl acrylamide sulfuric acid salt, dimethylaminopropyl acrylamide hydrochloric acid salt, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and/or diallyldimethyl ammonium chloride ("DADMAC"). In some embodiments, said one or more cationic monomers of said terpolymer and/or composition may comprise AETAC, MAPTAC, DADMAC, MAETAC, and/or DMAEMA. In some embodiments, said one or more cationic monomers of said terpolymer and/or composition may comprise AETAC. In some embodiments, said terpolymer and/or composition may further comprise one or more additives, for example, one or more coagulants. In some embodiments, said coagulants may comprise a mixture and/or combination of one or more inorganic coagulants and one or more organic coagulants. In some embodiments, said terpolymer or composition may comprise a metal sulfate, an aluminum comprising compound, or another coagulant or flocculant. In some embodiments, said metal sulfate may comprise aluminum sulfate. In some embodiments, said coagulant may comprise an iron-based coagulant, e.g., ferrous chloride. In some embodiments, said terpolymer and/or composition may comprise about 0.01 mol % to about 99.9 mol %, of one or more cationic monomers, about 0 to about 99.9 mol %, of one or more CDA monomers, and about 0 to about 99.9 mol % of one or more AMD monomers. In some embodiments, said terpolymer and/or composition may comprise about 0.1 mol % or less, 0.1 mol % or more, 0.2 mol % or more, 0.3 mol % or more, 0.4 mol % or more, 0.5 mol % or more, 1.0 mol % or more, 1.1 mol % or more, 1.2 mol % or more, 1.3 mol % or more, 1.4 mol % or more, 1.5 mol % or more, 1.6 mol % or more, 1.7 mol % or more, 1.8 mol % or more, 1.9 mol % or more, 2.0 mol % or more, 3.0 mol % or more, 4.0 mol % or more, 5.0 mol % or more, 6.0 mol % or more, 7.0 mol % or more, or 8.0 mol % of one or more of cationic monomers; about 10 mol % to about 60 mol %, or from about 20 mol % to about 45 mol %, or from about 25 mol % to about 27 mol % of one or more CDA monomers; and about 10 to about 90 mol %, or from about 50 mol % to about 80 mol % or from about 70 mol % to about 75 mol % of one or more AMD monomers. In some embodiments, said terpolymer and/or composition may comprise from about 70 mol % to about 75 mol % of one or more AMD monomers, from about 25 mol % to about 27 mol % of one or more CDA monomers, and from about 0.1 mol % to about 3 mol % of one or more cationic monomers. In some embodiments, said one or more cationic monomers may comprise AETAC.

In some embodiments, said composition may comprise aluminum sulfate at a concentration of about 50 ppm or less, 85 ppm or less, 125 ppm or less, 165 ppm or less, 200 ppm or less, 300 ppm or less, 400 ppm or less, 800 ppm or less, or 800 ppm or more. In some embodiments, said terpolymer or composition may comprise said one or more terpolymers at a concentration of about 50 ppm or less, 100 ppm or less, 200 ppm or less, 300 ppm or less, 400 ppm or less, 500 ppm or less, 800 ppm or less, or 800 ppm or more. In some embodiments, any composition as disclosed herein may be suitable for use as a flocculant. In some embodiments, said terpolymer or composition may be suitable for use in the treatment of tailings, for example, oil sands tailings.

Furthermore, the present embodiments generally encompass a process of treating tailings which comprises treating said tailings with an effective amount of a flocculant comprising at least one terpolymer comprising one or more AMD monomers, one or more CDA monomers, and one or more cationic monomers. In some embodiments, said terpolymer may comprise one or more AETAC, MAPTAC, DADMAC, MAETAC, and/or DMAEMA monomers. In some embodiments, said terpolymer may comprise one or more AETAC monomers. In some embodiments, said process may use any terpolymer or composition as described herein. In some embodiments, said process may further comprise the use of other flocculants or additives.

Additionally, the present embodiments generally pertain to a process of treating tailings which comprise water and solids, the process comprising: a. adding one or more terpolymers for the treatment of tailings, wherein said one or more terpolymers comprise one or more AMD monomers, one or more CDA monomers, and one or more cationic monomers; b. allowing at least a portion of the solids to flocculate; and c. separating at least a portion of the flocculated solids from the tailings. Also, the present embodiments generally pertain to a process of treating tailings which comprise water and solids, the process comprising: a. adding one or more terpolymers for the treatment of tailings, wherein said one or more terpolymers comprise one or more AMD monomers, one or more CDA monomers, and one or more cationic monomers; b. adding one or more other additives useful for the treatment of tailings; c. allowing at least a portion of the solids to flocculate; and d. separating at least a portion of the flocculated solids from the tailings. Said processes may comprise the use of any terpolymer and/or composition described herein. In some embodiments, the tailings may comprise oil sands tailings. In some embodiments, said one or more cationic monomers may comprise the following: acryloyloxyethyltrimethyl ammonium chloride ("AETAC"), methacryloyloxyethyltrimethylammonium chloride ("MAETAC"), methacrylamidopropyltrimethylammonium chloride ("MAPTAC"), acrylamidopropyltrimethylammonium chloride ("AETAC"), dialkylaminoalkyl acrylates and methacrylates, e.g., dimethylaminoethyl methacrylate ("DMAEMA"), and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as dimethylaminopropyl acrylamide methyl sulfate quaternary salt, dimethylaminopropyl acrylamide sulfuric acid salt, dimethylaminopropyl acrylamide hydrochloric acid salt, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and/or diallyldimethyl ammonium chloride ("DADMAC"). In some embodiments, said one or more cationic monomers may comprise AETAC, MAETAC, DADMAC, MAETAC, and/or DMAEMA. In some embodiments, said one or more cationic monomers may comprise AETAC.

In some embodiments, a process may further comprise adding one or more additives, for example, one or more coagulants. In some embodiments, said one or more coagulants may comprise a combination or mixture of one or more organic coagulants and one or more inorganic coagulants. In some embodiments, said coagulant may comprise a metal sulfate and/or an aluminum-containing compound. In some embodiments, said coagulant may comprise an aluminum sulfate. In some embodiments, said process may comprise addition of both said one or more terpolymers and said one or more coagulants, and said addition may result in synergistic effects. In some embodiments, said synergistic effects may include one or more of reduced turbidity values, reduced settling rates, reduced supernatant solids content or greater fines capture, reduced formation of non-segregated tailings; improved capture of organics in the released water, improved organics removal or a combination of any of the foregoing. In some embodiments, said synergistic effects may include greater fines capture resulting in better overflow clarity. In some embodiments, one or more terpolymers of said process may comprise about 0.01 mol % to about 99.9 mol %, of one or more AETAC monomers, about 0 to about 99.9 mol %, of one or more CDA monomers, and about 0 to about 99.9 mol %, of one or more AMD monomers. In some embodiments, said one or more terpolymers may comprise about 0.1 mol % or less, 0.1 mol % or more, 0.2 mol % or more, 0.3 mol % or more, 0.4 mol % or more, 0.5 mol % or more, 1.0 mol % or more, 1.1 mol % or more, 1.2 mol % or more, 1.3 mol % or more, 1.4 mol % or more, 1.5 mol % or more, 1.6 mol % or more, 1.7 mol % or more, 1.8 mol % or more, 1.9 mol % or more, 2.0 mol % or more, 3.0 mol % or more, 4.0 mol % or more, 5.0 mol % or more, 6.0 mol % or more, 7.0 mol % or more, or 8.0 mol % of one or more of cationic monomers; about 10 mol % to about 60 mol %, or from about 20 mol % to about 45 mol %, or from about 25 mol % to about 27 mol % of one or more CDA monomers; and about 10 to about 90 mol %, or from about 50 mol % to about 80 mol % or from about 70 mol % to about 75 mol % of one or more AMD monomers. In some embodiments, said one or more terpolymers may comprise from about 70 mol % to about 75 mol % of one or more AMD monomers, from about 25 mol % to about 27 mol % of one or more CDA monomers, and from about 0.1 mol % to about 3 mol % of one or more cationic monomers. In some embodiments, said one or more cationic monomers may comprise AETAC.

In some embodiments, a process may comprise adding aluminum sulfate at a concentration of about 50 ppm or less, 85 ppm or less, 125 ppm or less, 165 ppm or less, 200 ppm or less, 300 ppm or less, 400 ppm or less, 800 ppm or less, or 800 ppm or more to said tailings. In some embodiments, a process may comprise adding one or more terpolymers at a concentration of about 50 ppm or less, 100 ppm or less, 200 ppm or less, 300 ppm or less, 400 ppm or less, 500 ppm or less, 800 ppm or less, or 800 ppm or more to said tailings. In some embodiments, said one or more terpolymers may comprise a molecular weight ranging from 500,000 to 20,000,000 Daltons, or from about 500,000 to 10,000,000 Daltons, or from about 1,000,000 to 10,000,000 Daltons. In some embodiments, a process may further comprise treating the tailings with other polymers used in the treatment of tailings, for example, oil sands tailings. In some embodiments, a process may comprise separation of solids, wherein solids may be separated from the tailings by centrifuge, hydrocyclone, decantation, filtration, thickening, and/or another mechanical separation. In some embodiments, said process may comprise treatment of said tailings with said one or more terpolymers, and said process may result in a turbidity value of 1000 NTU or less, 800 NTU or less, 600 NTU or less, 400 NTU or less, 200 NTU or less, or 100 NT or less of said treated tailings. In some embodiments, said process may comprise treatment of said tailings with said one or more terpolymers, and said process may result in a settling rate of said treated tailings of 8 cm/min or more, 8 cm/min or less, 7 cm/min or less, 6 cm/min or less, 5 cm/min or less, 4 cm/min or less, 3 cm/min or less, 2 cm/min or less, or 1 cm/min or less. In some embodiments, said process may comprise treatment of said tailings with said one or more terpolymers, and said process may result results in a supernatant solids content of about 3 wt % or less, about 2.5 wt % or less, about 2 wt % or less, about 1.5 wt % or less, about 1 wt % or less, about 0.55 wt % or less, about 0.50 wt % or less, about 0.45 wt % or less, about 0.40 wt % or less, or about 0.35 wt % or less. In some embodiments, said process may comprise treatment of said tailings with said one or more terpolymers, and said process may result in a supernatant solids content of 1.00% or less, 0.90% or less, 0.80% or less, 0.70% or less, 0.60% or less, 0.50% or less, 0.40% or less, 0.30% or less, 0.20% or less, or 0.10% or less, further wherein said tailings stream may comprise from about 25% to about 44% solids.

DETAILED DESCRIPTION

Definitions

Figure 1:
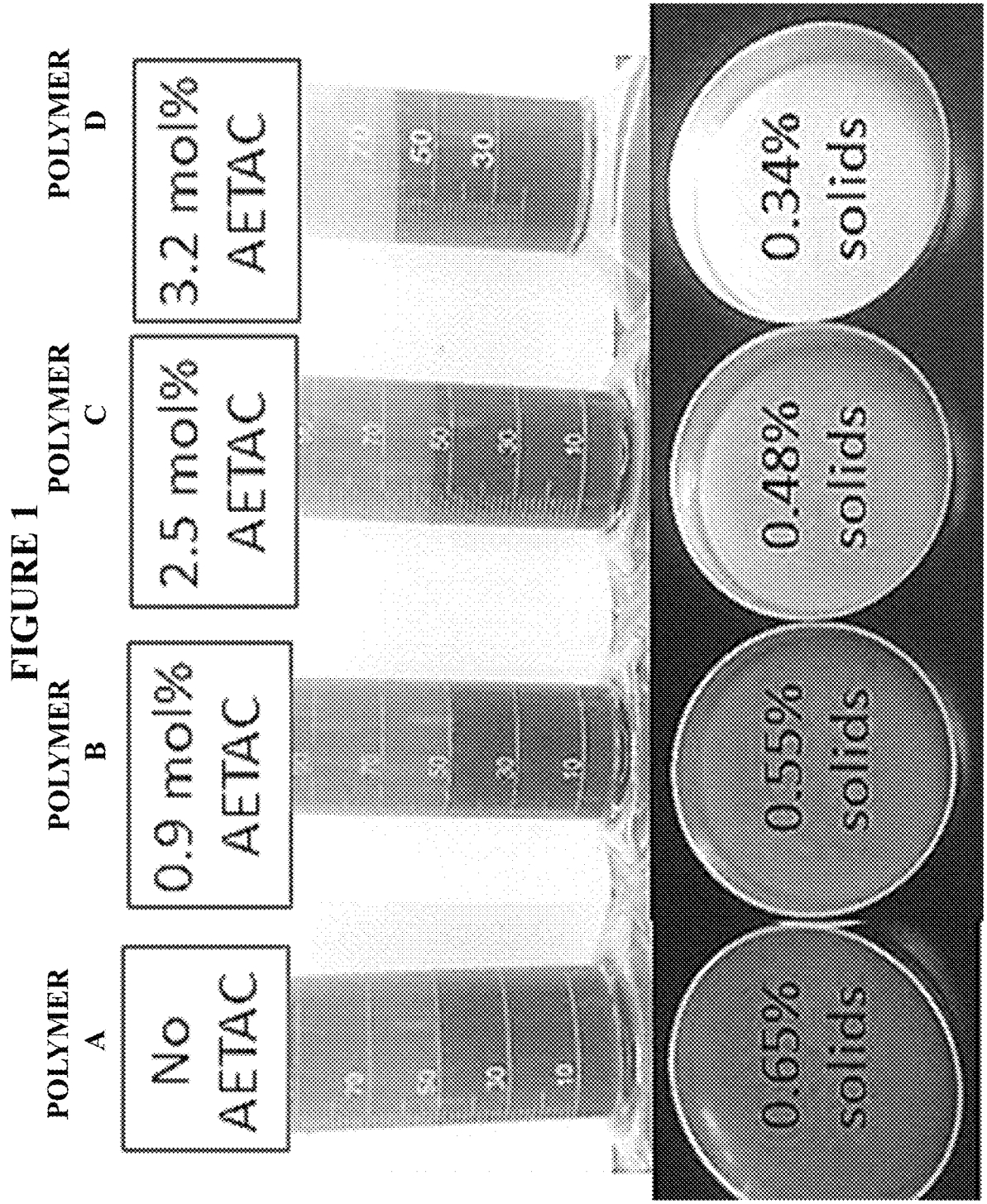
FIG. 1 shows the visible solid-liquid separation of a Mature Fine Tailings (MFT) sample treated with a copolymer and some exemplary terpolymers, as well as the measured solids content of the supernatant layer of each sample, in accordance with Example 1.
Figure 2:
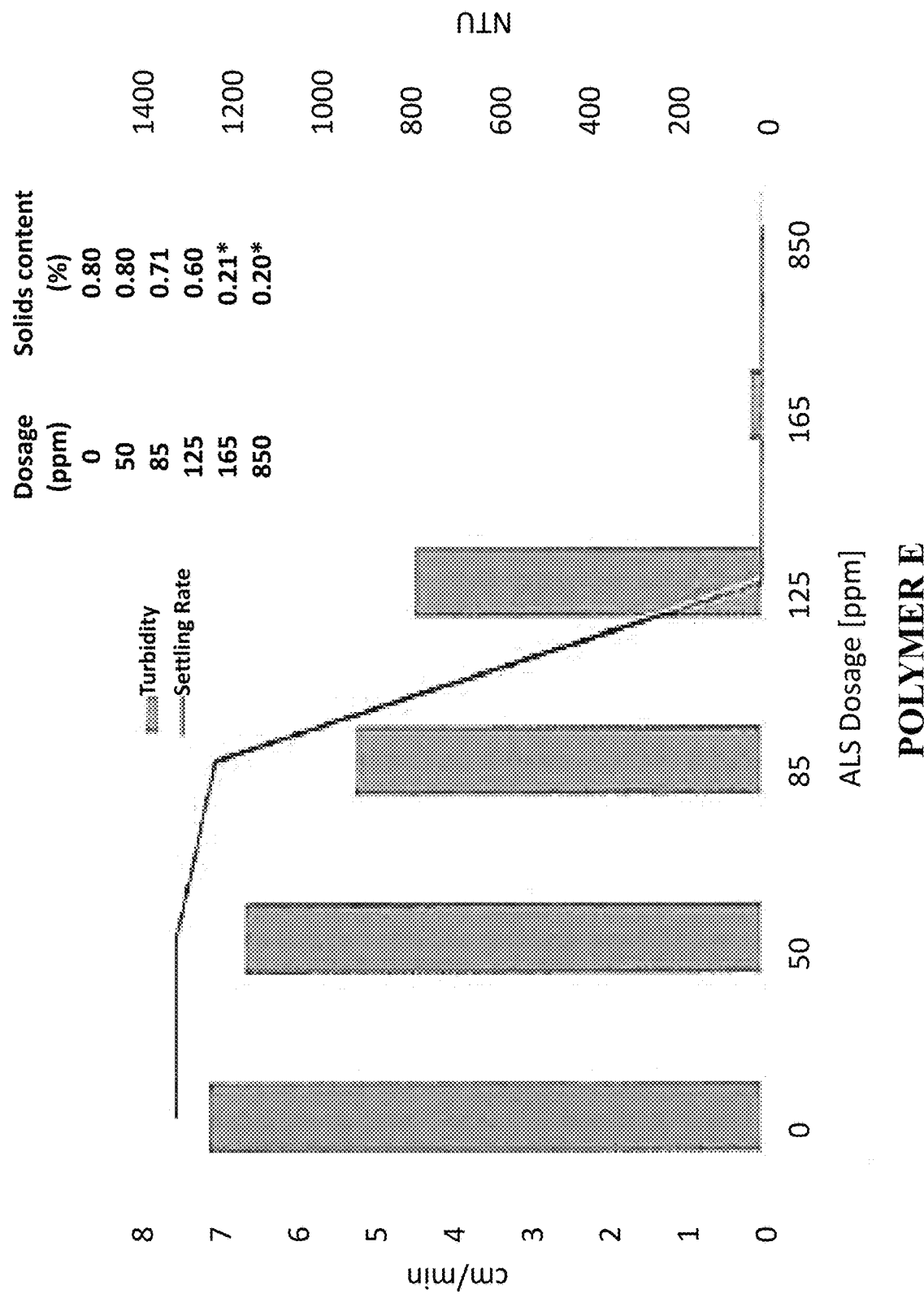
FIG. 2 shows the turbidity (NTU) and settling rate (cm/min) of an MFT sample treated with a copolymer of acrylamide and calcium diacrylate (Polymer E) and aluminum sulfate ("ALS") in accordance with Example 2.
Figure 3:
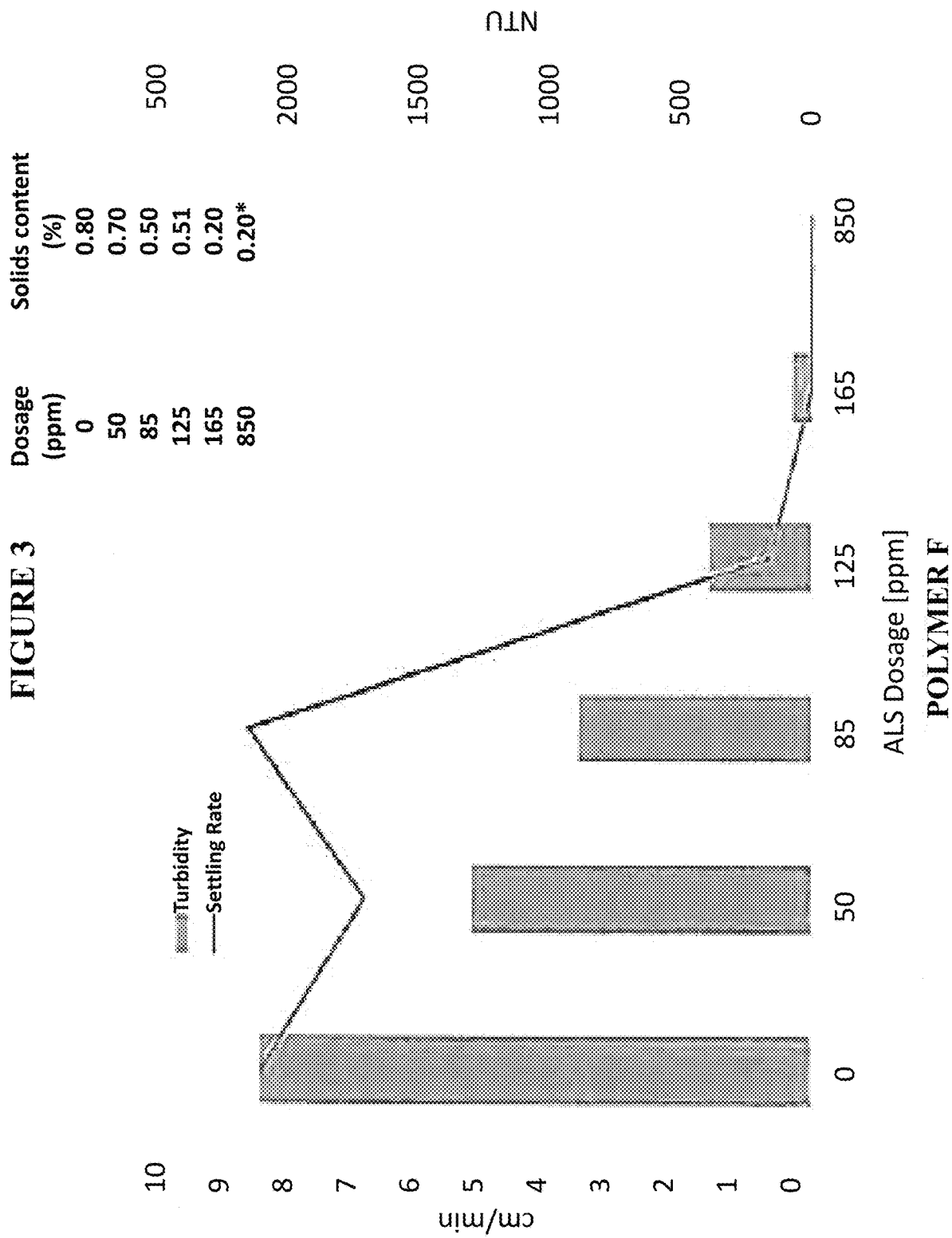
FIG. 3 shows the turbidity (NTU) and settling rate (cm/min) of an MFT sample treated with an exemplary terpolymer (Polymer F) and ALS in accordance with Example 2.
Figure 4:
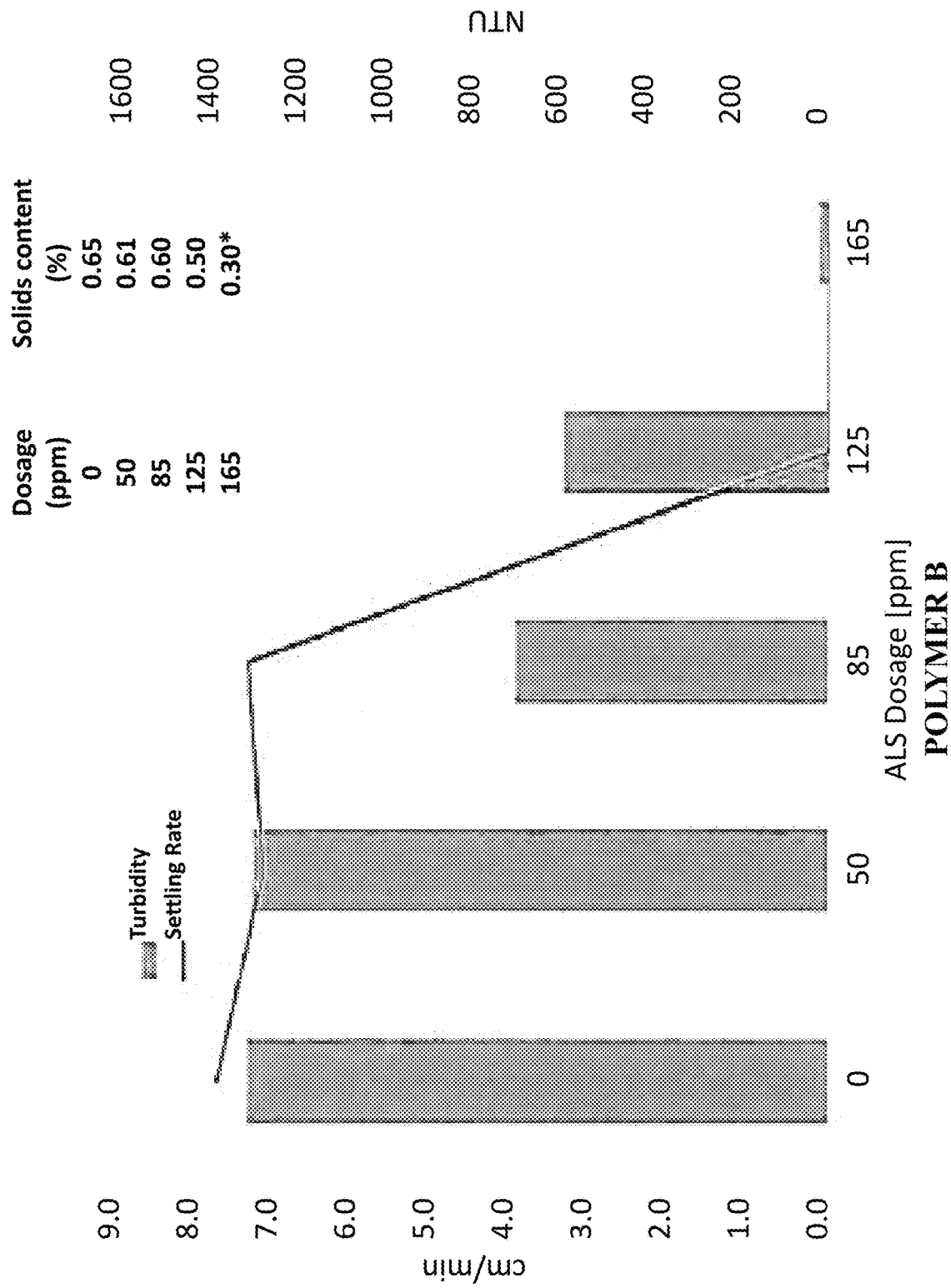
FIG. 4 shows the turbidity (NTU) and settling rate (cm/min) of an MFT sample treated with an exemplary terpolymer (Polymer B) and ALS in accordance with Example 2.
Figure 5:
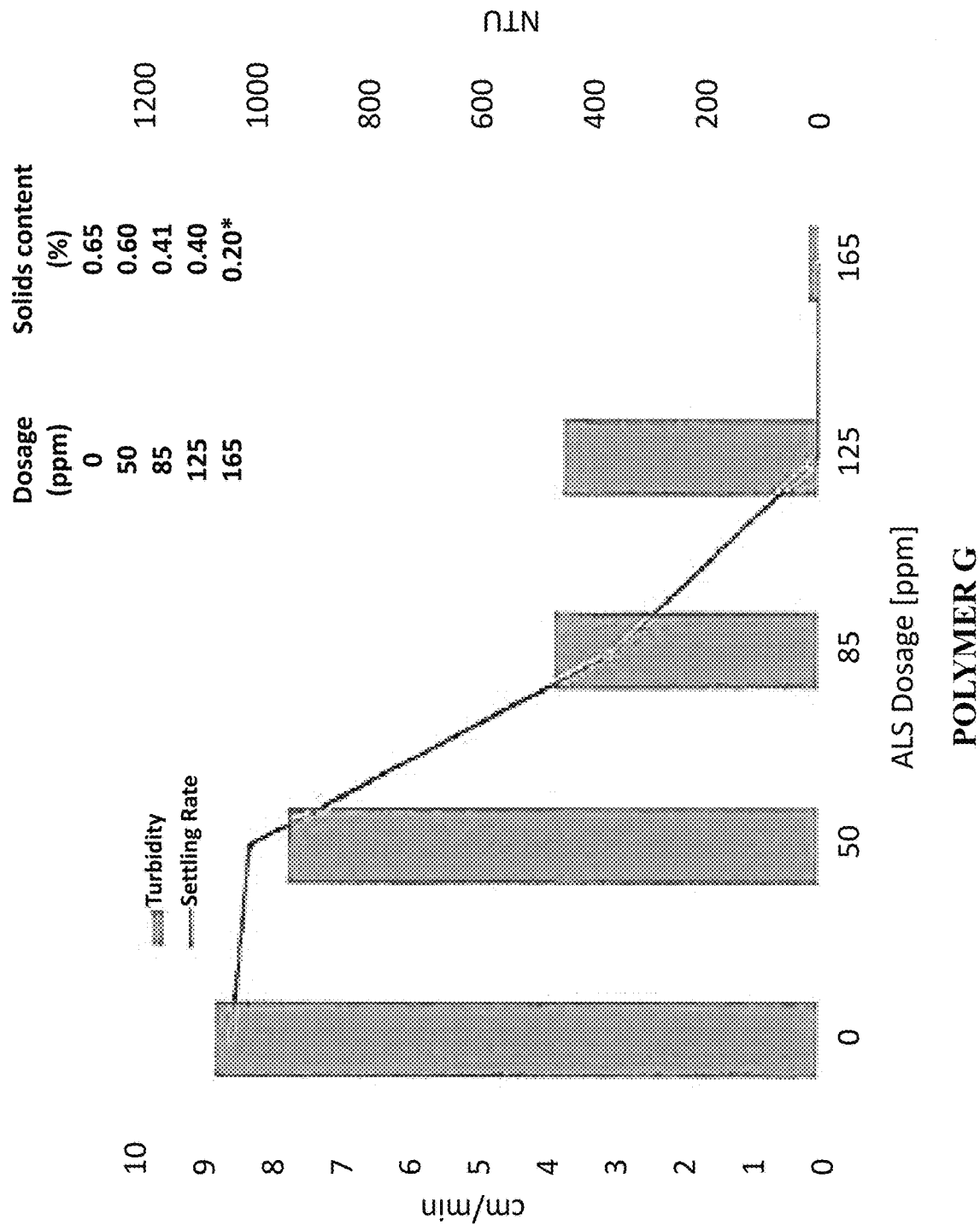
FIG. 5 shows the turbidity (NTU) and settling rate (cm/min) of an MFT sample treated with an exemplary terpolymer (Polymer G) and ALS in accordance with Example 2.

The various exemplary embodiments disclosed herein generally relate to terpolymers and compositions containing said terpolymers, wherein said terpolymers comprise at least one nonionic monomer, at least one anionic monomer, and at least one cationic monomer. Other exemplary embodiments comprise various methods and processes of using said terpolymers and compositions containing said terpolymers for the treatment of tailings stream, such as for example, an oil sands tailings stream, to separate the suspended solids therefrom.

As used herein the singular forms "a", "and", and "the" include plural referents unless the context clearly dictates otherwise. All technical and scientific terms used herein have the same meaning as commonly understood to one of ordinary skill in the art to which this invention belongs unless clearly indicated otherwise.

As used herein, the terms "tailings" and "tailings stream" generally refer to the discarded materials that may be generated in the course of extracting a valuable material from an ore. Exemplary tailings include, but are not limited to, tailings from coal, copper, gold mining and mineral processing. Exemplary tailings also include tailings from the processing of oil sands. While many of the exemplary embodiments are described with reference to oil sands tailings, it is understood that the exemplary compositions, processes, and methods are not limited to applications in oil sands tailings, but also can be applied to various other tailings. The term tailings is meant to be inclusive of but not limited to any of the types of tailings discussed herein, for example, process oil sand tailings, in-process tailings, oil sands tailings, and the like.

The terms "process oil sand tailings", "oil sands tailings stream", "oil sands process tailings", or "oil sands tailings", generally refer to tailings that may be directly generated as bitumen is extracted from oil sands. In tar sand processing, tailings may comprise the whole tar sand ore and any net additions of process water less the recovered bitumen.

Any tailings fraction obtained from the process, such as tailings from primary separation cell, primary flotation and secondary flotation, process tailings, froth treatment tailings, and mature fine tailings or combination thereof, may be treated by the exemplary processes described herein. The tailings may comprise a colloidal sludge suspension comprising clay minerals and/or metal oxides/hydroxides. In exemplary embodiments, the tailings stream may comprise water and solids.

Tailings generally comprise mineral solids having a variety of particle sizes. Mineral fractions with a particle diameter greater than 44 microns may be referred to as "coarse" particles, or "sand." Mineral fractions with a particle diameter less than 44 microns may be referred to as "fines" and often are comprised essentially of silica and silicates and clays that may be easily suspended in the water. Ultrafine solids (<2 μm) may also be present in the tailings stream often primarily are made up of clays. Tailings herein include but are not limited to those including one or more of the coarse particles, fine tailings, MFT, FFT, or ultrafine solids.

Oil sands tailings herein may additionally include but are not limited to including one or more of any of the tailings streams that may be produced in a process to extract bitumen from an oil sands ore. In some embodiments, the tailings may comprise paraffinic or naphthenic tailings, for example paraffinic froth tailings. The tailings may be combined into a single tailings stream for dewatering or each tailings stream may be dewatered individually.

In some embodiments, the tailings stream may be produced from an oil sands ore and may comprise water and solids, for example sand and fines. In exemplary embodiments, the tailings stream, for example, oil sands tailings stream, may comprise at least one of the coarse tailings, fluid fine tailings, MFT, fine tailings, and ultrafine tailings. In some embodiments, the processes may be used to treat ultrafine solids. In some embodiments, the tailings stream, for example, oil sands tailings stream, may comprise a fine (particle size <44 μm) content of about 10 to about 100 wt %, about 20 to about 100 wt %, about 30 to about 100 wt %, or about 40 to about 90 wt % of the dry tailings. In some embodiments, the tailings stream may comprise about 0.01 to about 5 wt % of bitumen. In some embodiments, the oil sands ore tailings stream may comprise process tailings.

Any of the above terms referencing "tailings" additionally further specifically encompasses fluid fine tailings ("FFT") such as mature fine tailings ("MFT") from tailings ponds and fine tailings from ongoing extraction operations (for example, froth treatment tailings or thickener underflow) which may bypass a tailings pond.

As used herein, "fines" generally refers to mineral fractions that may comprise a particle diameter less than 44 microns.

As used herein, "fluid fine tailings" or "FFT" generally refers to a liquid suspension of oil sand fines in water with a solids content greater than 2%.

The term "mature fine tailings" ("MFT") generally refers to fine tailings that may comprise a solids content of about 30-35%, and that generally may comprise almost entirely solids <44 microns. MFT generally may behave as a fluid-like colloidal material. MFT may comprise FFT with a low sand to fines ratio ("SFR"), i.e., generally less than about 0.3, and a solids content that may be generally greater than about 30%.

As used herein, "sand" generally refers to mineral fractions that may comprise a particle diameter greater than 44 microns.

As used herein, the term "coagulant" generally refers to an agent that may be used to destabilize colloidal suspensions. Exemplary coagulants may comprise but are not limited to those comprising inorganic coagulants such as aluminium sulfate ("ALS") and other metal sulfates and gypsum, organic coagulants such as polyamines and poly-DADMACs, and other inorganic and organic coagulants known in the art. In some embodiments, a coagulant to be used with the compositions, methods, and processes described herein may comprise ALS. In some embodiments, a coagulant which is used with the compositions, methods, and processes described herein may provide synergistic benefits when used in association with the terpolymers described herein.

In some embodiments, the coagulant may comprise a poly(diallyldimethyl ammonium chloride) ("polyDAD-MAC") compound; an epi-polyamine compound; a polymer that may comprise one or more quaternized ammonium groups, such as acryloyloxyethyltrimethylammonium chloride, methacryloyloxyethyltrimethylammonium chloride, methacrylamidopropyltrimethylammonium chloride, acrylamidopropyltrimethylammonium chloride; or a mixture thereof. In some embodiments, one or more inorganic coagulants may be added to the tailings stream. An inorganic coagulant may, for example, reduce, neutralize or invert electrical repulsions between particles. Exemplary inorganic coagulants may comprise but are not limited to inorganic salts such as aluminum chloride, aluminum sulfate, aluminum chlorohydrate, polyaluminum chloride, polyaluminum silica sulfate, ferric chloride, ferrous chloride, ferric sulfate, ferric chloride sulfate, polyferric sulfate, ferrous sulfate, lime, calcium chloride, calcium sulfate, magnesium chloride, sodium aluminate, various commercially available iron or aluminum salts coagulants, or combinations thereof. In some embodiments, the coagulant may comprise a combination or mixture of one or more organic coagulants and/or one or more inorganic coagulants. In some specific embodiments, the coagulant may comprise a combination or mixture of at least one organic coagulant and at least one inorganic coagulant.

As used herein the term "nonionic monomer" generally refers to a monomer that possesses a neutral charge. Exemplary nonionic monomers may comprise but are not limited to comprising monomers selected from the group consisting of acrylamide ("AMD"), methacrylamido, vinyl, allyl, ethyl, and the like. Some exemplary nonionic monomers may be substituted with a side chain selected from, for example, an alkyl, arylalkyl, dialkyl, ethoxyl, and/or hydrophobic group. In an exemplary embodiment, a nonionic monomer may comprise AMD.

As used herein, the term "anionic monomers" may refer to either anionic monomers that are substantially anionic in whole or (in equilibrium) in part, at a pH in the range of about 6.0 to about 8.0. The "anionic monomers" may be neutral at low pH (from a pH of about 2 to about 6), or to anionic monomers that are anionic at low pH. In exemplary embodiments, an anionic monomer may comprise calcium diacrylate.

Additional examples of anionic monomers may comprise but are not limited to comprising acrylic, methacrylic, maleic monomers and the like, additional examples include but not limited to any monomer substituted with a carboxylic acid group or salt thereof. In some embodiments, anionic monomers which may be substituted with a carboxylic acid group include, for example, acrylic acid, and methacrylic acid. In some embodiments, an anionic monomer may be a (meth)acrylamide monomer wherein the amide group has been hydrolyzed to a carboxyl group. Said monomer may be a derivative or salt of a monomer according to the embodiments. Additional examples of anionic monomers comprise but are not limited to comprising sulfonic acids or a sulfonic acid group, or both. In some embodiments, the anionic monomers may comprise a sulfonic function that may comprise, for example, 2-Acrylamido-2-methylpropanesulfonic Acid ("ATBS").

As used herein, the term "cationic monomer" generally refers to a monomer that possesses a positive charge. Examples of cationic monomers may comprise but are not limited to comprising acryloyloxyethyltrimethyl ammonium chloride ("AETAC"), methacryloyloxyethyltrimethylammonium chloride ("MAETAC"), methacrylamidopropyltrimethylammonium chloride ("MAPTAC"), dimethylaminoethyl methacrylate ("DMAEMA"), acrylamidopropyltrimethylammonium chloride ("APTAC"), diallyldimethylammonium chloride ("DADMAC").

Exemplary cationic monomers may also comprise but are not limited to comprising dialkylaminoalkyl acrylates and methacrylates, e.g., dimethylaminoethyl methacrylate ("DMAEMA"), and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as dimethylaminopropyl acrylamide methyl sulfate quaternary salt, dimethylaminopropyl acrylamide sulfuric acid salt, dimethylaminopropyl acrylamide hydrochloric acid salt, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride ("DADMAC"). Alkyl groups may generally be $C_{1-8}$ alkyl.

As used herein, the terms "polymer," "polymers," "polymeric," and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by, for example, polymerizing, a particular monomer. Unless otherwise specified, a polymer may also comprise a "copolymer" that may comprise two or more different recurring units that may be formed by, for example, copolymerizing, two or more different monomers, and/or by chemically modifying one or more recurring units of a precursor polymer. Unless otherwise specified, a polymer or copolymer may also comprise a "terpolymer" which generally refers to a polymer that comprises three or more different recurring units. Any one of the one or more polymers discussed herein may be used in any applicable process, for example, as a flocculant.

As used herein, the term "flocculant" generally refers to a reagent that may bridge neutralized or coagulated particles into larger agglomerates, typically resulting in more efficient settling. In exemplary embodiments, the flocculant may comprise any one or more of the polymers and/or any one of the compositions discussed herein. In an exemplary embodiment, the flocculant may comprise one or more terpolymers comprising one or more nonionic monomers, one or more anionic monomers, and one or more cationic monomers. In an exemplary embodiment, the flocculant may comprise a terpolymer comprising AMD, CDA, and one or more cationic monomers. In an exemplary embodiment, the flocculant may comprise a terpolymer comprising AMD, CDA, and AETAC. In another exemplary embodiment, the flocculant may comprise a terpolymer comprising AMD, CDA, and one or more cationic monomers, wherein said cationic monomer may comprise AETAC, MAPTAC, DADMAC, MAETAC, and/or DMAEMA.

As used herein, the term "produced water" generally refers to any aqueous fluids produced during any type of industrial process, for example, an oil or gas extraction or recovery process, or any portion thereof. Typically the produced water may be obtained during an industrial process involving the use of water, generally copious amounts of water, wherein the end product of such industrial process may be an aqueous material or "produced water" which may be of an undesirable purity. Produced water may be generated during processes or portions thereof which involve oil sands.

As used herein, in additional to its conventional meaning in the art, the terms "mol %" and/or "mole %", and the like, generally encompass both theoretical mol % as well as mol % as determined by an analytic technique, for example, 13C NMR.

Terpolymers, Compositions, and Processes

Disclosed herein are processes for improving the disposing of, reclaiming, treating, and/or dewatering tailings, such as, for example, an oil sands tailings stream. Said processes may comprise the use of a composition comprising one or more exemplary terpolymers that comprise one or more nonionic monomers, one or more anionic monomers, and one or more cationic monomers. According to various exemplary embodiments, the exemplary terpolymers and compositions may be used in processes to treat tailings, for example, oil sands tailings, to assist with solid-liquid separation of the tailings. The solid-liquid separation, for example, may aid in efficiently recycling water and to reducing the volume of tailings which may be transferred to a dedicated disposal area and/or a tailings pond.

[Terpolymers]

According to the various embodiments described herein, an exemplary terpolymer comprises one or more nonionic monomers, one or more anionic monomers, and one or more cationic monomers. In some embodiments, exemplary terpolymers may comprise AMD, CDA, and one or more cationic monomers, wherein said cationic monomer may comprise AETAC, MAPTAC, DADMAC, MAETAC, and/or DMAEMA. In an embodiment, exemplary terpolymers may comprise AMD, CDA, and AETAC. In some embodiments, exemplary terpolymers may comprise AMD, one or more anionic monomers, and one or more cationic monomers. In some embodiments, exemplary terpolymers may comprise one or more nonionic monomers, CDA, and AETAC.

In an exemplary embodiment, exemplary terpolymers may comprise 0.1 mol % or less, 0.1 mol % or more, 0.2 mol % or more, 0.3 mol % or more, 0.4 mol % or more, 0.5 mol % or more, 1.0 mol % or more, 1.1 mol % or more, 1.2 mol % or more, 1.3 mol % or more, 1.4 mol % or more, 1.5 mol % or more, 1.6 mol % or more, 1.7 mol % or more, 1.8 mol % or more, 1.9 mol % or more, 2.0 mol % or more, 3.0 mol % or more, 4.0 mol % or more, 5.0 mol % or more, 6.0 mol % or more, 7.0 mol % or more, or 8.0 mol % or more cationic monomer, such as, for example, AETAC MAPTAC, DADMAC, MAETAC, and/or DMAEMA.

According to various embodiments, the exemplary terpolymer comprises from about 0.1 mol % to about 99.9 mol % of the anionic monomer. For example, the exemplary terpolymer may comprise from about 10 mol % to about 60 mol %, or from about 20 mol % to about 45 mol %, or from about 25 mol % to about 27 mol % anionic monomer.

According to various embodiments, the exemplary terpolymer comprises from about 0.1 mol % to about 99.9 mol % of the nonionic monomer. For example, the exemplary terpolymer may comprise from about 10 to about 90 mol %, or from about 50 mol % to about 80 mol % or from about 70 mol % to about 75 mol % nonionic monomer.

According to some embodiments, an exemplary terpolymer comprises from about about 70 mol % to about 75 mol % nonionic monomer, and from about 25 mol % to about 27 mol % anionic monomer, and from about 0.1 mol % to about 3 mol % cationic monomer.

In some embodiments, the one or more exemplary terpolymers may have an average molecular weight of about 500,000 to 20,000,000 Daltons, or from about 500,000 to 10,000,000 Daltons, or from about 1,000,000 to 10,000,000 Daltons. In some embodiments, the exemplary terpolymers may be linear, branched, or crosslinked.

In exemplary embodiments, the exemplary terpolymers may be in dry form. For example, exemplary terpolymers may be dry powder or granules. In other exemplary embodiments the exemplary terpolymers may be provided in other forms, including but not limited to solution, emulsion, suspension, dispersion, slurry, or other forms. One having ordinary skill in the art, having the benefit of this disclosure, would understand the various forms in which the exemplary terpolymer could be provided.

[Compositions]

Further disclosed herein are exemplary compositions that comprise one or more exemplary terpolymers described herein, that comprise one or more nonionic monomers, one or more anionic monomers, and one or more cationic monomers. In some embodiments, said compositions may comprise one or more exemplary terpolymers that comprise AMD, CDA, and AETAC. In some embodiments, said compositions may comprise one or more terpolymers that comprise AMD, CDA, and one or more cationic monomers, wherein said cationic monomer may comprise AETAC, MAPTAC, DADMAC, MAETAC, and/or DMAEMA.

In some exemplary embodiments, said compositions may comprise about 50 ppm or less, 100 ppm or less, 200 ppm or less, 300 ppm or less, 400 ppm or less, 500 ppm or less, 800 ppm or less, or 800 ppm or more of the exemplary terpolymers.

In other exemplary embodiments, the composition may further comprise one or more additional components or additives. In some embodiments, a composition according to the invention comprising a terpolymer-additive combination may provide synergistic effects when used in processes related to the treatment of tailings, such as oil sands tailings. For example, such composition comprising a terpolymer-additive combination may increase settling rates and/or a decrease turbidity. Exemplary additives may comprise but are not limited to coagulants, surfactants, anti-foaming agents, polymers, flocculants, dispersants, mineral oils, mixtures thereof, combinations thereof, and other necessary or desired additives. For example, the composition may comprise one or more cationic coagulants or cationic flocculants. Exemplary cationic flocculants or coagulants may include, but are not limited to: a polyDADMAC compound; an epi-polyamine compound; a polymer that may comprise one or more quaternized ammonium groups, such as acryloyloxyethyltrimethylammonium chloride, methacryloyloxyethyltrimethylammonium chloride, methacrylamidopropyltrimethylammonium chloride, acrylamidopropyltrimethylammonium chloride; or a mixture thereof. In some embodiments, the composition may comprise one or more coagulants, for example, one or more inorganic coagulants and/or one or more organic coagulants. Exemplary inorganic coagulants may, for example, reduce, neutralize or invert electrical repulsions between particles. Exemplary inorganic coagulants may comprise but are not limited to inorganic salts such as aluminum chloride, aluminum sulfate, aluminum chlorohydrate, polyaluminum chloride, polyaluminum silica sulfate, ferric chloride, ferrous chloride, ferric sulfate, ferric chloride sulfate, polyferric sulfate, ferrous sulfate, lime, calcium chloride, calcium sulfate, magnesium chloride, sodium aluminate, or various commercially available iron or aluminum salts coagulants, or combinations thereof. In exemplary embodiments, a composition may comprise one or more exemplary terpolymers, comprising AMD, CDA, and AETAC, and an additive comprising an aluminum sulfate coagulant. In some embodiments, a composition according to the invention may comprise one or more terpolymers, e.g., ones comprising AMD, CDA, and AETAC, and one or more coagulants. Said one or more coagulants may comprise a combination or mixture of one or more organic coagulants with one or more inorganic coagulants. Said one or more coagulants may comprise a combination or mixture of any of the coagulants described herein.

In some exemplary embodiments, the composition may comprise about 50 ppm or less, 85 ppm or less, 125 ppm or less, 165 ppm or less, 200 ppm or less, 300 ppm or less, 400 ppm or less, 800 ppm or less, or 800 ppm or more of the one or more additives.

According to some exemplary embodiments, the composition comprising the one or more exemplary terpolymers and optional additives may be provided as a blend. According to some exemplary embodiments, the one or more exemplary terpolymers and optional additives may be separately provided and combined in-situ or just prior to introduction to the tailing stream. According to some exemplary embodiments, the one or more exemplary terpolymers and optional additives may be separately added to the tailings stream.

In exemplary embodiments, the composition comprising the one or more exemplary terpolymers, may be in dry form. For example, said one or more exemplary terpolymers may by dry blended alone, or (optionally) with additives. In other exemplary embodiments the one or more exemplary terpolymers and/or the composition comprising one or more exemplary terpolymers, may be provided in other forms, including but not limited to solution, emulsion, suspension, dispersion, slurry, or other forms. One having ordinary skill in the art, having the benefit of this disclosure, would understand the various forms in which the exemplary composition could be provided.

[Processes]

Also disclosed herein are processes for the treatment of an aqueous suspension of solids, such as a tailing stream using terpolymers. An exemplary process comprises the addition of one or more exemplary terpolymers to an aqueous suspension of solids, followed by dewatering of the treated material to at least partially separate the liquid and solid components thereof.

In some embodiments, processes for treating a tailings stream which comprise water and solids may comprise: (i) adding one or more exemplary terpolymers or a composition comprising said exemplary terpolymers to the tailings stream one or more times; (ii) allowing at least a portion of the solids to flocculate; and (iii) separating at least a portion of the flocculated solids from the tailings stream. In some embodiments, such process may result in the formation of flocculated solids. In some embodiments, such processes may further comprise the addition of one or more additives.

In some exemplary processes, the total dosage of the one or more exemplary terpolymers or composition(s) containing said one or more terpolymers, may be any amount that produces a necessary and/or desired result, such as, for example, a desired separation of solids from a tailings stream. The effective dosage amount may depend, at least in part, on the characteristics of the tailings stream, such as, for example, the solids content of the tailings stream, the clay content of the tailings stream (e.g., the clay to water ratio), or one or more other factors. In an exemplary embodiment, the total dosage of the composition and/or one or more exemplary terpolymers, may be sufficient to provide between about 50 and about 2500 grams of said one or more terpolymers per dry ton of solid tailings (g/t). In an exemplary embodiment the one or more exemplary terpolymers may be used as flocculants with tailings suspensions that may have a solids content of less than 20%, and the total dosage of said one or more terpolymers may be from about 50 to about 800 g/t. In an exemplary embodiment one or more exemplary terpolymers, may be used as flocculants to treat a concentrated tailings suspension having a solids content greater than 20%, and the total dosage of said one or more terpolymers may be from about 500 to about 2500 g/t.

In some embodiments, the one or more exemplary terpolymers are dissolved and/or diluted in an aqueous liquid prior to adding to the tailings material, in order to provide a predetermined dosage to the tailings material. For example, the one or more exemplary terpolymers may be dissolved in process water from an oil sands process, to provide a solution having from about about 0.01-2% by weight of said polymer. In exemplary embodiments, the one or more exemplary terpolymers may be applied in a solution to a dilute tailings suspension at a solution concentration of about 0.01% to about 1.0%, about 0.01% to about 0.5%, or about 0.01 to about 0.4% by weight. In an exemplary embodiment, the one or more exemplary terpolymers may be applied to a dilute tailings suspension at a concentration of about 0.01 to 0.5% by weight. In another exemplary embodiment, the one or more terpolymers may be applied to a concentrated tailings suspension at a solution concentration of about 0.1 to about 5.0%, about 0.1% to about 2%, about 0.4% to about 1.5%, or about 0.4% to about 1.2% by weight.

In some exemplary embodiments, the total dosage of the one or more terpolymers, is any dosage sufficient to achieve a necessary or desired result, for example, desired separation of solids. In some embodiments, said dosage may be 50 ppm or less, 85 ppm or less, 125 ppm or less, 165 ppm or less, 200 ppm or less, 300 ppm or less, 400 ppm or less, 800 ppm or less, or 800 ppm or more, wherein said dosages refer to the parts polymer to the parts of dry tailings solids.

In some exemplary processes, the separation step may be achieved by natural or gravity settling, for example, in a tailings pond or dedicated disposal area or end-pit lake. In exemplary embodiments, the separation step may be at least partially accomplished by one or more mechanical separation techniques. Exemplary separation techniques include any means known to those skilled in the art, including but not limited to centrifuges, hydrocyclones, decantation, filtration, thin-lift dewatering, thickeners, or any other mechanical separation methods. In exemplary embodiments, the separation step may include a combination of one or more mechanical separation techniques with natural or gravity settling techniques.

The exemplary processes described herein may provide enhanced flocculation of solid materials in the tailings, better separation of the solids from water, and/or an increased rate of separation of the solids from the water. The exemplary process described herein may expand the range of operating conditions that may produce a desired separation result.

The exemplary processes described herein may provide flocculated beds with higher densities, may produce compact beds that may dewater faster, and/or may build yield strength faster than comparable treatments without the addition of the said one or more exemplary terpolymers. In some exemplary embodiments, the processes may accelerate dewatering of the tailings stream.

In some exemplary processes, the composition and/or one or more exemplary terpolymers may be added prior to and/or during a bitumen extraction process. In some exemplary embodiments the composition and/or one or more exemplary terpolymers may be introduced under conditions whereby it contacts oil sands ore at a primary separation step or in a primary separation vessel.

In some exemplary processes, the composition and/or one or more exemplary terpolymers may be added to the tailings stream before or after desanding. Desanding is typically a process wherein the tailings are settled for a period of time to form desanded tailings as the supernatant. Desanding may be done also for example by using a hydrocyclone.

In some exemplary processes, the composition and/or one or more exemplary terpolymers may be added to the tailings stream prior to or during a mechanical separation stage.

In some exemplary processes, the composition and/or one or more exemplary terpolymers may be added to the tailing stream prior to deposition in a tailings pond, dedicated disposal area, or end pit lake.

In some exemplary processes, the composition and/or one or more terpolymers may be used in the presence of, or in combination with, one or more additives, for example, aluminum sulfate, in any of the processes described herein and/or are known in the art. Such additives may comprise but are not limited to coagulants, surfactants, anti-foaming agents, polymers, flocculants, mineral oils, mixtures thereof, and other necessary or desired additives. In some embodiments, the additives may be present in an amount of 0.01 to 50 weight percent based on a total weight of dry ore or tailings. For example, such additives may be added to the tailings stream at any point in the process, one or more times, in order to achieve a desired result, including simultaneously, before or after the step of adding the composition and/or the one or more terpolymers, wherein said terpolymers may comprise one or more nonionic monomers, one or more anionic monomers, and one or more cationic monomers, according to the exemplary embodiments.

In some embodiments, the composition comprising one or more exemplary terpolymers, and optionally one or more additives may be used in any of the exemplary processes as described herein.

In some exemplary embodiments, the processes may result in a decrease in turbidity in the supernatant of said treated tailings. The turbidity of the tailings supernatant after the exemplary treatment process may comprise a value of 1000 Nephelometric Turbidity Units ("NTU") or less, 800 NTU or less, 600 NTU or less, 400 NTU or less, 200 NTU or less, or 100 NT or less.

In some exemplary embodiments, the processes may result in a decrease in settling rate of the solids in the treated tailings. According to the various exemplary embodiments, treating a tailings stream with a composition and/or said one or more terpolymers and (optionally) said one or more additives may result in a settling rate of treated tailings of 8 cm/min or less or more, 8 cm/min or less, 7 cm/min or less, 6 cm/min or less, 5 cm/min or less, 4 cm/min or less, 3 cm/min or less, 2 cm/min or less, or 1 cm/min or less.

In some exemplary embodiments, a process may result in a decrease in the supernatant solids content of the treated tailings. For example, in an untreated tailings stream having from about 25% to 44% solids, use of the exemplary processes to treat said tailings stream may result in a supernatant solids content of the treated tailings comprising 1.00% or less, 0.90% or less, 0.80% or less, 0.70% or less, 0.60% or less, 0.50% or less, 0.40% or less, 0.30% or less, 0.20% or less, or 0.10% or less.

In some exemplary embodiments, the process for the treatment of tailings may comprise the addition of a composition consisting essentially of the one or more terpolymers. For example, in some embodiments, the one or more terpolymers alone may provide efficient dewatering of the tailings and no other chemicals (e.g., additives) may be necessary to achieve the necessary or desired amount of dewatering.

According to some exemplary embodiments, the clays in the supernatant, which may be present as a very dilute suspension, may be flocculated using the composition and/or the one or more terpolymers, and may be separated from the tailings stream. For example, in some exemplary embodiments, a second or subsequent dosing of the one or more terpolymers may be added to the supernatant to flocculate the clays. Said second or subsequent dosing of one or more terpolymers may comprise any of the terpolymers and/or compositions described herein. In some embodiments, said second or subsequent dosing of one or more terpolymers may occur during or with any of the processes as described herein. Said second or subsequent addition may aid in obtaining a desired result, for example, a desired separation of solids from a tailings stream.

In some exemplary embodiments, the process may optionally comprise adding one or more cationic coagulants or cationic flocculants to the tailings stream. For example, the one or more cationic coagulants or flocculants may be added to the tailings stream before, after or at the same time as the addition of the composition and/or the one or more terpolymers. In some embodiments, a cationic coagulant or flocculant may be added to the supernatant. In some exemplary embodiments, the cationic flocculant or coagulant may comprise a polyDADMAC compound; an epi-polyamine compound; a polymer that may comprise one or more quaternized ammonium groups, such as acryloyloxyethyltrimethylammonium chloride, methacryloyloxyethyltrimethylammonium chloride, methacrylamidopropyltrimethylammonium chloride, acrylamidopropyltrimethylammonium chloride; or a mixture thereof. In some exemplary embodiments, one or more coagulants, e.g., one or more organic coagulants and/or one or more inorganic coagulants, may be added to the tailings stream. An inorganic coagulant may, for example, reduce, neutralize or invert electrical repulsions between particles. Exemplary inorganic coagulants may comprise but are not limited to inorganic salts such as aluminum chloride, aluminum sulfate, aluminum chlorohydrate, polyaluminum chloride, polyaluminum silica sulfate, ferric chloride, ferrous chloride, ferric sulfate, ferric chloride sulfate, polyferric sulfate, ferrous sulfate, lime, calcium chloride, calcium sulfate, magnesium chloride, sodium aluminate, various commercially available iron or aluminum salts coagulants, or combinations thereof. In some exemplary embodiments, the process may further comprise adding one or more exemplary terpolymers, comprising AMD, CDA, and AETAC, and one or more coagulants. Said one or more coagulants may e.g., comprise a combination or mixture of one or more organic coagulants with one or more inorganic coagulants. More particularly said one or more coagulants may comprise a combination or mixture of any of the coagulants described herein or their equivalents.

In some exemplary embodiments, the a process comprising the addition of the exemplary composition and/or the one or more terpolymers to a tailings stream, may be used in processes used to dewater the tailings so as to provide a solid material, for example, one that possesses a desired yield strength. In exemplary embodiments, the resulting dewatered tailings may have sufficient yield strength so as to provide trafficable solids. In some embodiments, the dewatered tailings may comprise a yield stress of greater than about 5,000 Pa after one year, or a yield stress of greater than about 10,000 Pa within five years.

In some exemplary embodiments, the resulting dewatered solids may be handled or may be processed in any manner as necessary or desired. In some exemplary embodiments, the dewatered solids may be handled in compliance with governmental regulations. In some exemplary embodiments, the resultant solids may be disposed of, may be sent to a tailings pond for additional settling, or when solids may be a concentrated source of minerals, the solids may be used a raw materials or feed to produce compounds for commercial products. In some exemplary embodiments, the separated water may be handled or may be processed in any manner as necessary or desired. In an exemplary embodiment, the separated water may be recycled to the process ("recycled water"). For example, the recycled water may be added to the crushed oil sands ore for bitumen extraction. Recycled water may also be added to the process at any point where water may be added.

In some exemplary embodiments, the processes may be carried out at temperature of about 1° C. to about 30° C., or about ambient temperature to about 80° C.

In some exemplary embodiments, the processes may result in the separation of substantially all of the solids from the tailings stream. In some exemplary embodiments, the processes may result in a supernatant comprising about 3 wt % or less, about 2.5 wt % or less, about 2 wt % or less, about 1.5 wt % or less, about 1 wt % or less, about 0.55 wt % or less, about 0.50 wt % or less, about 0.45 wt % or less, about 0.40 wt %, or about 0.35 wt % or less solids.

In some exemplary embodiments, the processes include a thickening process. In such exemplary embodiments, the use of the one or more terpolymers may provide improved results, as compared to other general processes without the terpolymers. In general, the thickening process often involves starting with a dilute tailings substrate (7-15% solids), mixing with chemical aids, and then introducing the treated material with the chemical aid(s) to a thickener, wherein the flocculated solids settle and free water rises to the top. This thickening process generally results in a clean overflow water which can be recycled, and a thickened underflow which can reach upwards of 50% solids.

According to the various embodiments, such exemplary processes may provide one or more advantages as compared to other general methods of tailings treatment, for example, oil sands tailings treatment, including but not limited to (a) greater fines capture and segregation, (b) prevention of the formation of non-segregated tailings, (c) improved capture and segregation of organics in the released water, and (d) simplified treatment processing options.

The following examples are presented for illustrative purposes only and are not intended to be limiting.

EXAMPLES

Example 1: Treatment of MFT with Exemplary Terpolymers

In the following example, a copolymer (Polymer A) of acrylamide and calcium diacrylate and a series of exemplary terpolymers (Polymers B-D) consisting of acrylamide ("AMD"), calcium diacrylate ("CDA"), and cationic monomer AETAC ("acryloyloxyethyltrimethyl ammonium chloride") were prepared having properties shown in Table 1, below. The copolymer and terpolymer samples were diluted with process water from an oil sands processor to prepare polymer solutions having 0.4 wt % solids.

TABLE 1

POLYMERIC FLOCCULANTS

| | Results by 13C NMR | | |
|---|---|---|---|
| EXPT Name | Mole % AMD | Mole % AA* | Mole % AETAC |
| Polymer A | 74.0 | 26.0 | 0.00 |
| Polymer B | 72.3 | 26.8 | 0.91 |
| Polymer C | 70.1 | 27.3 | 2.54 |
| Polymer D | 68.5 | 28.3 | 3.20 |

*Note that although the anionic component above is listed as acrylic acid (AA), each of these samples are co- or terpolymers with calcium diacrylate A sample of mature fine tailings (MFT) and process water was obtained from an oil sands processor. External analysis of the MFT by Maxxam Analytics determined the composition of the MFT to be about 33.53% solids, about 62.51% water, and about 3.76% bitumen. The MFT was diluted with the process water to provide an MFT solution having approximately 10% solids, and was vigorously stirred to homogenize the tailings. Four 150-170 g aliquots of the MFT solution were transferred to 250 mL plastic beakers. The beakers were subsequently stirred with a four-blade pitched impeller at 400 rpm for 1 minute prior to chemical addition. Next, the desired copolymer and terpolymer solutions A-D, were added to the MFT solutions at a single dose of 500 ppm. Each MFT/polymer mixture was then stirred for an additional 30 sec to condition the flocs and then the impeller was stopped. The mixtures were transferred to a 250 mL graduated cylinder, and the volume height of the settling floc bed was recorded over time, and then allowed to settle overnight. As shown in FIG. 1, upon visual comparison of the four samples, it was found that using the exemplary terpolymers resulted in a better separation of the solids, and a cleaner supernatant.

After allowing the samples to settle overnight, the supernatant was further evaluated for solids content. To measure the solids content, 30.00 g±0.2 g was extracted from the supernatant layer of each sample, and added to an aluminum pan. The aluminum pans were dried in an oven overnight at 110° C. The wt % solids determined from the oven solids analysis shown in the picture of the pans in FIG. 1. It was found that treatment of the MFT samples with exemplary terpolymers having AETAC resulted in cleaner supernatant (lower % of solids content) as compared to treatment with the copolymer containing AMD-CDA only. Treatment with Polymer D, which had the highest content of AETAC, resulted in the supernatant with the lowest amount of solids.

Example 2: Treatment of MFT with Exemplary Terpolymers and Aluminum Sulfate

In the following example, a copolymer (Polymer E) of acrylamide and calcium diacrylate and a series of exemplary terpolymers (Polymer samples B, F, and G) were prepared comprising nonionic monomer AMD, anionic monomer CDA, and different levels of cationic monomer AETAC, having the theoretical amount of AETAC shown in Table 2, below. The copolymer and terpolymer samples were diluted with process water from an oil sands processor to prepare polymer solutions having 0.4 wt % solids.

TABLE 2

POLYMERIC FLOCCULANTS

| EXPT Name | Theoretical mole % AETAC | Theoretical mole % AA |
|---|---|---|
| E | 0% | 26% |
| F | 1.7% | 23.2% |
| B | 1.7% | 26.2% |
| G | 1.7% | 33.1% |

Samples of MFT and produced water from obtained from an oil sands processor. The MFT was diluted with the process water to provide an MFT solution having approximately 10% solids. A four-blade pitched impeller was used to stir the MFT solution at 400 rpm for 1 minute in a 400 mL plastic beaker. Next, an aluminum sulfate (ALS) coagulant was added to the MFT samples, at the doses shown in FIGS. 2-5, and the solutions were stirred for 1 minute. The copolymer and terpolymer solutions were then added to the MFT samples at a dose of 500 ppm, and stirred for an additional minute. After mixing, each tailings solution was transferred to a 250 mL graduated cylinder for visual inspection, settling rate calculation, turbidity calculation, and supernatant solids content evaluation.

FIGS. 2-5 show the effect of each copolymer and terpolymer with the various levels of ALS as a coagulant. It can be observed that Polymer F demonstrated a lowered turbidity at low coagulant dosage while maintaining relatively high settling rates. The results presented in FIGS. 2-5 indicated that the exemplary terpolymer samples containing AETAC may benefit the performance of flocculation in conjunction with ALS for the treatment of oil sands tailings. It was additionally noted that at higher coagulant dosages the tailings were stable and settled very slowly with a minimal height difference (~30 ml in the 250 ml graduated cylinder), although the water quality (e.g., turbidity) improved significantly.

As shown in FIGS. 1-5, it was found that treatment of MFT samples with the exemplary terpolymer samples containing AETAC resulted in cleaner supernatant (lower solids content), with relatively high settling rates, when compared to treatment with the copolymer of AMD-CDA. A synergistic effect was found when MFT was treated with a combination of the exemplary terpolymer and ALS coagulant.

The invention claimed is:

1. A terpolymer suitable for use as a flocculant for treating an aqueous suspension of solids, wherein said terpolymer is comprised of (i) acrylamide ("AMD") (ii) calcium diacrylate ("CDA"), and (iii) acryloyloxyethyltrimethyl ammonium chloride ("AETAC") monomers, and wherein the mole percent of said (iii) AETAC monomers ranges from 0.3 mol % to 3.2 mol %.

2. The terpolymer of claim 1, wherein the mole percent of said (ii) CDA monomers ranges from about 20 mol % to about 45 mol %.

3. A process of treating tailings, which comprises treating said tailings with a flocculating effective amount of a terpolymer according to claim 2.

4. The terpolymer of claim 1, wherein the mole percent of said (i) AMD monomers ranges from about 50 mol % to about 80 mol %.

5. A process of treating tailings, which comprises treating said tailings with a flocculating effective amount of a terpolymer according to claim 4.

6. The terpolymer of claim 1, wherein the mole percent of said (ii) CDA monomers ranges from about 25 mol % to about 27 mol %.

7. A process of treating tailings, which comprises treating said tailings with a flocculating effective amount of a terpolymer according to claim 6.

8. The terpolymer of claim 1, wherein the mole percent of said (i) AMD monomers ranges from about 68.5 mol % to about 75 mol %.

9. A process of treating tailings, which comprises treating said tailings with a flocculating effective amount of a terpolymer according to claim 8.

10. A terpolymer composition comprising the terpolymer of claim 1 and one or more aluminum salt coagulants selected from the group consisting of aluminum chloride, aluminum sulfate, aluminum chlorohydrate, polyaluminum chloride, polyaluminum silica sulfate, sodium aluminate, an aluminum comprising compound, and combinations thereof, wherein said terpolymer and said aluminum salt coagulants are formulated together.

11. The terpolymer composition according to claim 10, wherein (a) said aluminum salt coagulant comprises aluminum sulfate; and/or (b) said terpolymer composition comprises aluminum sulfate at a concentration of about 50-85 ppm, about 85-125 ppm, about 125-165 ppm, about 165-200 ppm, about 200-300 ppm, about 300-400 ppm, about 400-800 ppm, or 800 ppm or more.

12. A tailings composition, optionally an oil sand tailings composition, comprising tailing, and about 50-100 ppm, about 100-200 ppm, about 200-300 ppm, about 300-400 ppm, about 400-500 ppm, about 500-800 ppm, or 800 ppm or more of a terpolymer composition according to claim 11.

13. A tailings composition, optionally an oil sand tailings composition, comprising tailings, and about 50-100 ppm, about 100-200 ppm, about 200-300 ppm, about 300-400 ppm, about 400-500 ppm, about 500-800 ppm, or 800 ppm or more of a terpolymer composition according to claim 10.

14. A tailings composition, optionally an oil sand tailings composition, comprising tailing, and about 50-100 ppm, about 100-200 ppm, about 200-300 ppm, about 300-400 ppm, about 400-500 ppm, about 500-800 ppm, or 800 ppm or more of one or more terpolymers according to claim 1.

15. A process of treating tailings, which comprises treating said tailings with a flocculating effective amount of a terpolymer according to claim 1.

16. A process of treating tailings, which comprises treating said tailings with a flocculating effective amount of a terpolymer according to claim 1 and one or more aluminum salt coagulants selected from the group consisting of aluminum chloride, aluminum sulfate, aluminum chlorohydrate, polyaluminum chloride, polyaluminum silica sulfate, sodium aluminate, an aluminum comprising compound, and combinations thereof, wherein said terpolymer and said aluminum salt coagulants are formulated together.

17. The process of treating tailings of claim 16, wherein said one or more aluminum salt coagulants is aluminum sulfate.

18. A terpolymer suitable for use as a flocculant for treating tailings, wherein said terpolymer is comprised of (i) acrylamide ("AMD") (ii) calcium diacrylate ("CDA"), and (iii) acryloyloxyethyltrimethyl ammonium chloride ("AETAC"), and further wherein the mole percent of the one or more AETAC monomers ranges from 0.1 mol % to 1.0 mol %.

19. The terpolymer of claim 18, wherein the mole percent of said (ii) CDA ranges from about 20 mol % to about 45 mol %, and the mole percent of said (i) AMD ranges from about 50 mol % to about 80 mol %.

20. A process of treating tailings, which comprises treating said tailings with a flocculating effective amount of a terpolymer according to claim 19.

21. The terpolymer of claim 18, wherein the mole percent of said (ii) CDA ranges from about 25 mol % to about 27 mol %, and/or the mole percent of said (i) AMD ranges from about 68.5 mol % to about 75 mol %.

22. A process of treating tailings, which comprises treating said tailings with a flocculating effective amount of a terpolymer according to claim 21.

23. A terpolymer composition comprising the terpolymer of claim 18 and one or more aluminum salt coagulants selected from the group consisting of aluminum chloride, aluminum sulfate, aluminum chlorohydrate, polyaluminum chloride, polyaluminum silica sulfate, sodium aluminate, an aluminum comprising compound, and combinations thereof, wherein said terpolymer and said aluminum salt coagulants are formulated together, and further wherein said aluminum salts are present at a concentration of about 50-85 ppm, about 85-125 ppm, about 125-165 ppm, about 165-200 ppm, about 200-300 ppm, about 300-400 ppm, about 400-800 ppm, or 800 ppm or more.

24. A tailings composition, optionally an oil sand tailings composition, comprising tailing, and about 50-100 ppm, about 100-200 ppm, about 200-300 ppm, about 300-400 ppm, about 400-500 ppm, about 500-800 ppm, or 800 ppm or more of one or more terpolymers according to claim 18.

25. A process of treating tailings, which comprises treating said tailings with a flocculating effective amount of a terpolymer according to claim 18.

* * * * *